United States Patent
Pan (10) Patent No.: US 7,733,741 B2
(45) Date of Patent: Jun. 8, 2010

(54) METHOD FOR REDUCING 3-D MIGRATION OPERATOR TO 2-D MIGRATION OPERATOR FOR INHOMOGENEOUS MEDIA

(75) Inventor: Naide Pan, Sugar Land, TX (US)

(73) Assignee: PGS Geophysical AS, Lysaker (NO)

( * ) Notice: Subject to any disclaimer, the term of this patent is extended or adjusted under 35 U.S.C. 154(b) by 532 days.

(21) Appl. No.: 11/784,020

(22) Filed: Apr. 5, 2007

(65) Prior Publication Data

US 2008/0247272 A1    Oct. 9, 2008

(51) Int. Cl.
G01V 1/24    (2006.01)
(52) U.S. Cl. .......................................... 367/51; 367/53
(58) Field of Classification Search .................. 367/38, 367/50–53
See application file for complete search history.

(56) References Cited

U.S. PATENT DOCUMENTS

| | | | | |
|---|---|---|---|---|
| 6,021,094 A * | 2/2000 | Ober et al. | ...................... | 367/53 |
| 6,049,759 A * | 4/2000 | Etgen | ........................... | 702/14 |
| 6,446,007 B1 * | 9/2002 | Finn et al. | ..................... | 702/14 |
| 6,987,706 B2 * | 1/2006 | Wood | ........................... | 367/43 |
| 7,095,678 B2 * | 8/2006 | Winbow et al. | ................ | 367/73 |
| 7,561,491 B2 * | 7/2009 | Robinson | ...................... | 367/43 |
| 7,564,740 B2 * | 7/2009 | Wood | ........................... | 367/43 |

OTHER PUBLICATIONS

Mason, et al. Broadband Synthetic aperture borehole radar interferometry. Journal of Applied Geophysics, 47 (2001) 299-308.*
B. Gibson, K. Larner, S. Levin, "Efficient 3-D Migration in Two-Steps", Geophysical Prospecting, 1983, pp. 1-33, vol. 1.
V. Devaux, G.H.F. Gardner, T. Rampersad, "3-D Pre-Stack Depth Migration by Kirchhoff Operator Splitting", 66th Ann. Int'l. Mtg., SEG, Exp. Abstr., 1996, pp. 455-458.
N. Pan, W. Perkin, W. Lynn, W. S. French, "Efficient 3-D Filtering Using Projected 2-D True-Dip Sections", 62nd Ann. Int'l. Mtg., SEG Exp. Abstr., 1992, pp. 1042-1045.

* cited by examiner

*Primary Examiner*—Scott A Hughes
(74) *Attorney, Agent, or Firm*—E. Eugene Thigpen; Charles R. Schweppe (57) ABSTRACT

Time slices of seismic data are transformed from rectangular space-time domain to cylindrical space-time domain. 2-D seismic migration is performed on the transformed data for each radial direction. Slices of the migrated data are inverse transformed back to the rectangular space-time domain, generated migrated 3-D data for generally inhomogeneous media.

16 Claims, 4 Drawing Sheets

―31
Apply forward transform operator to time slices of seismic data to transform data from rectangular to cylindrical coordinates ―32
Apply 2-D operator corresponding to 3-D dip-dependent operator to transformed data along radial lines given by azimuth angle θ

―33
Apply inverse transform operator to time or depth slice of data to transform data from cylindrical to rectangular coordinates

METHOD FOR REDUCING 3-D MIGRATION OPERATOR TO 2-D MIGRATION OPERATOR FOR INHOMOGENEOUS MEDIA

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of seismic data processing. Specifically, the invention is a method for imaging the earth through seismic migration.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors at or near the surface of the earth, in an overlying body of water, or at known depths in boreholes and recorded.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of arrays.

The resulting seismic data obtained in performing the survey is processed to yield information relating to the geologic structure and properties of the subterranean formations in the area being surveyed. The processed seismic data is processed for display and analysis of potential hydrocarbon content of these subterranean formations. The goal of seismic data processing is to extract from the seismic data as much information as possible regarding the subterranean formations in order to adequately image the geologic subsurface.

In order to identify locations in the Earth's subsurface where there is a probability for finding petroleum accumulations, large sums of money are expended in gathering, processing, and interpreting seismic data. A crucial step in processing seismic data is seismic migration. Seismic migration is the process of constructing the reflector surfaces defining the subterranean earth layers of interest from the recorded seismic data. The processing procedure of seismic migration provides an image of the earth in depth or time.

The image of the structure of the Earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface.

Migration is intended to account for both positioning and amplitude effects associated with the transmission and reflection of seismic energy from seismic sources to seismic receivers. Since transmission and reflection occurs in three rather than two dimensions, migration is better performed in three rather than two dimensions. However, three-dimensional (3-D) migration is computationally more complicated than two-dimensional (2-D) migration, because azimuth effects are involved. Thus, 3-D migration is more expensive than 2-D migration.

In practice, this complication with azimuths presents many more challenges for inhomogeneous (vertically or laterally varying velocity) media than for homogeneous (constant velocity) media. Most 3-D migration algorithms for inhomogeneous media comprise implementation of complicated one-pass 3-D migration operators. Great efforts have been dedicated to resolving the azimuth effects inherent in all 3-D migration operators and computations.

Consequently, one approach in the development of 3-D seismic imaging has been an attempt to reduce 3-D migration back to the less expensive 2-D migration. Because of the azimuth effects involved in 3-D operators and calculations, 3-D migration can not generally be realized exactly by implementation of 2-D migration algorithms. So, only limited success has been achieved and only exactly in the constant velocity case, using two-step (or two-pass) migration methods. Two examples of two-step migration techniques are described here.

Gibson B., Lamer, K., and Levin, S., in their 1983 article, "Efficient 3-D migration in two-steps", *Geophysical Prospecting*, Vol. 31, p. 1-33, describe a two-step 3-D post-stack time migration, utilizing cascading 2-D time migrations as a substitute for 3-D post-stack time migration. This two-step approach first migrates all time sections in one direction with a 2-D algorithm and then sorts the resulting data into time sections in the orthogonal direction and migrates all these sections with a 2-D algorithm. Gibson et al. (1983) show that their method provides increased efficiency when applied to Kirchhoff summation and finite difference techniques, but is found to be less efficient than conventional one-pass 3-D migration in the frequency-wavenumber domain. The method is exact for homogeneous media, but not for inhomogeneous media. For vertically inhomogeneous media, the correct migration velocity is unavailable for the first 2-D migration step, so migrated positions are inaccurate. For laterally inhomogeneous media, Gibson et al. (1983) cannot provide the required depth migration version.

Devaux, V., G. H. F. Gardner, and T. Rampersad, in their 1996 article, "3-D pre-stack depth migration by Kirchhoff operator splitting", 66th Annual International Meeting, Society of Exploration Geophysicists, Expanded Abstracts, p. 455-458, describe two-step 3-D pre-stack depth migration, utilizing two alternating 2-D migrations as a substitute for 3-D pre-stack depth migration. The first step is a 2-D time migration in the cross-line direction. The second step is an iterative 2-D depth migration in the in-line direction, with the velocity model being updated between iterations. Devaux et al. (1996) state that their 2-D method is equivalent to full 3-D pre-stack depth migration for constant velocity media, but only an approximation for variable velocity media.

Therefore, migrating 3-D seismic data in a general inhomogeneous velocity media is conventionally done with either a one-pass implementation of 3-D migration operators or with a two-pass implementation of 3-D migration by 2-D migration operators that is only an approximation. A one-pass 2-D migration operator would be computationally much less expensive than the one-pass implementation of 3-D migration operators, but much more accurate than the approximate two-pass implementation of 3-D migration.

Pan, N., et al., (including the present inventor) in their 1992 article, "Efficient 3-D filtering using projected 2-D true-dip sections", $62^{nd}$ Annual International Meeting, SEG, Expanded Abstract, p. 1042-1045, describe a transform method for 3-D post-stack time migration which can accomplish exact 3-D time migration by using any accurate 2-D migration algorithm. The method of Pan et al. (1992) is a one-pass implementation of a 2-D migration operator as a substitute for 3-D seismic migration, at least for the post-stack time migration case.

However, in areas with structural complexity, seismic migration should be performed with pre-stack data and in the depth domain, rather than post-stack in the time domain, in order to obtain more accurate stacked images. This, too, is computationally more expensive in general. Pan et al. (1992) does not discuss how to handle pre-stack data or depth migration.

Thus, a need exists for a transformation method to reduce a one-pass 3-D migration operator to a one-pass 2-D migration operator for general inhomogeneous media, which applies to pre- or post-stack data, time or depth migration.

BRIEF SUMMARY OF THE INVENTION

The invention is a method for performing 3-D seismic migration for generally inhomogeneous media. Time slices of seismic data are transformed from rectangular space-time domain to cylindrical space-time domain. 2-D seismic migration is performed on the transformed data for each radial direction. Slices of the migrated data are inverse transformed back to the rectangular space-time domain, generated migrated 3-D data for generally inhomogeneous media.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for performing 3-D azimuth-dip dependent filtering operations for generally inhomogeneous media. In one embodiment, the invention is a method for transforming 3-D seismic migration into one-pass 2-D seismic migration for inhomogeneous media. The invention is an extension of the method first disclosed in Pan et al. (1992), which was a method for one-pass 2-D seismic migration for post-stack time migration for vertically inhomogeneous media. The method of the invention has more general application to pre-stack as well as post-stack data, depth as well as time migration, laterally as well as vertically inhomogeneous media, and in the wavenumber as well as in the spatial domain.

Seismic data is typically collected and stored in a rectangular (Cartesian) coordinate domain with spatial coordinates (x, y, z) and time coordinate t. The spatial coordinates x and y usually represent orthogonal horizontal coordinate directions, such as the in-line and cross-line directions of the survey in which the data are acquired. The spatial coordinate z usually represents the vertical coordinate direction, such as depth measured positive downward. The method of the invention transforms seismic data from the rectangular coordinate domain to a more useful cylindrical coordinate domain, with spatial coordinates (r, θ, z). Here the coordinates r and θ are the radial direction and azimuthal angle, respectively, which are the polar coordinate counterparts to the rectangular coordinates x and y. The relationship between rectangular coordinates x and y and polar coordinates r and θ is given by:

$$x = r\cos\theta, \quad y = r\sin\theta, \qquad (1)$$
$$r = \sqrt{x^2 + y^2}, \quad \theta = \tan^{-1}\frac{y}{x}$$

In one embodiment, the technique employed in the method of the invention to transform seismic data from a rectangular to a cylindrical coordinate domain utilizes the 2-D Radon transform. The forward Radon transform in the x and y coordinates, designated by an operator R, may be defined as follows:

$$q(r, \theta, z, t) = \tag{2}$$
$$R[p(x, y, z, t)] = \int_{-\infty}^{\infty}\int_{-\infty}^{\infty} P(x, y, z, t)\delta(x\cos\theta + y\sin\theta - r)\,dx\,dy$$

where $\delta(\cdot)$ is the Dirac delta function. Here, the forward Radon transform R has transformed the data $p(x, y, z, t)$ in rectangular coordinates to $q(r, \theta, z, t)$ in cylindrical coordinates.

Figure 1A:
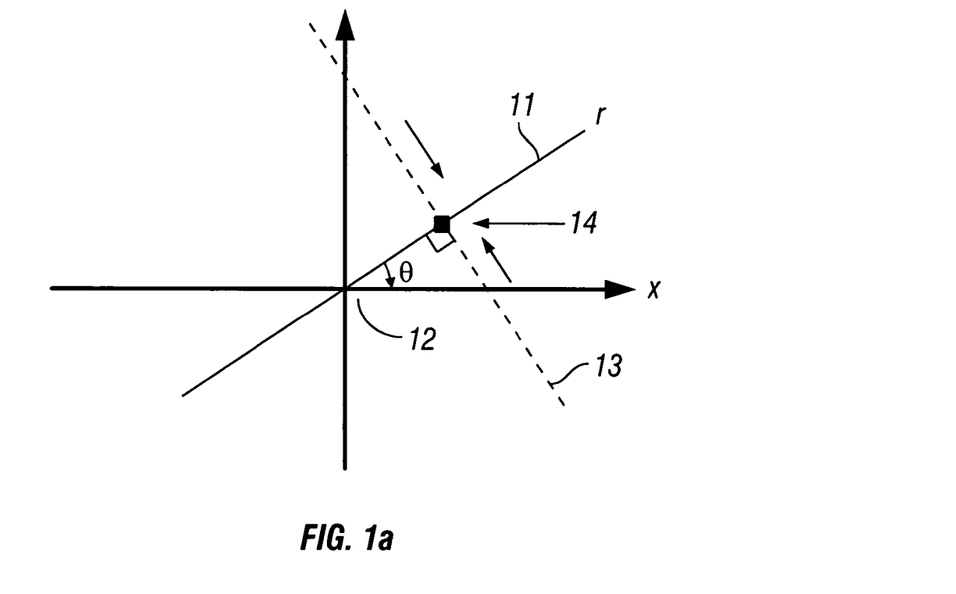
FIGS. 1a and 1b are graphs illustrating the results of Radon transforms in an embodiment of the method of the invention for performing 3-D seismic migration for generally inhomogeneous media.

FIGS. 1a and 1b are graphs illustrating the results of applying the Radon transforms in an embodiment of the method of the invention for performing 3-D seismic migration for generally inhomogeneous media. The geometrical meaning of applying a forward Radon transform is shown in FIG. 1a. For a given radial direction 11, corresponding to an azimuth angle $\theta$ 12, all data values along the perpendicular dashed line 13 are summed to a value at the intersection point 14 $s(r, \theta, l\Delta t)$. This summation is done for all radial distance values r along the radial line 11. Seismic events dipping in the radial direction given by azimuth angle $\theta$ 12 will have a strike direction parallel to the perpendicular dashed line 13. Therefore, any data with a true-dip direction of $\theta$ 12 will have a significant contribution to the summation in Equation (2).

Similarly, the inverse Radon transform in the r and $\theta$ coordinates, designated by an operator $R^{-1}$, may be defined as follows:

$$p(x, y, z, t) = \tag{3}$$
$$R^{-1}[q'(r, \theta, z, t)] = \int_{-\infty}^{\infty}\int_{-\infty}^{\infty} q'(r, \theta, z, t)\delta(x\cos\theta + y\sin\theta - r)\,dr\,d\theta.$$

The data q is replaced in Equation (3) by a filtered version, q', that has the enhanced frequency components that are required for exact inversion. Here, the inverse Radon transform $R^{-1}$ has transformed the data $q'(r, \theta, z, t)$ in cylindrical coordinates back to $p(x, y, z, t)$ in rectangular coordinates.

Figure 1B:
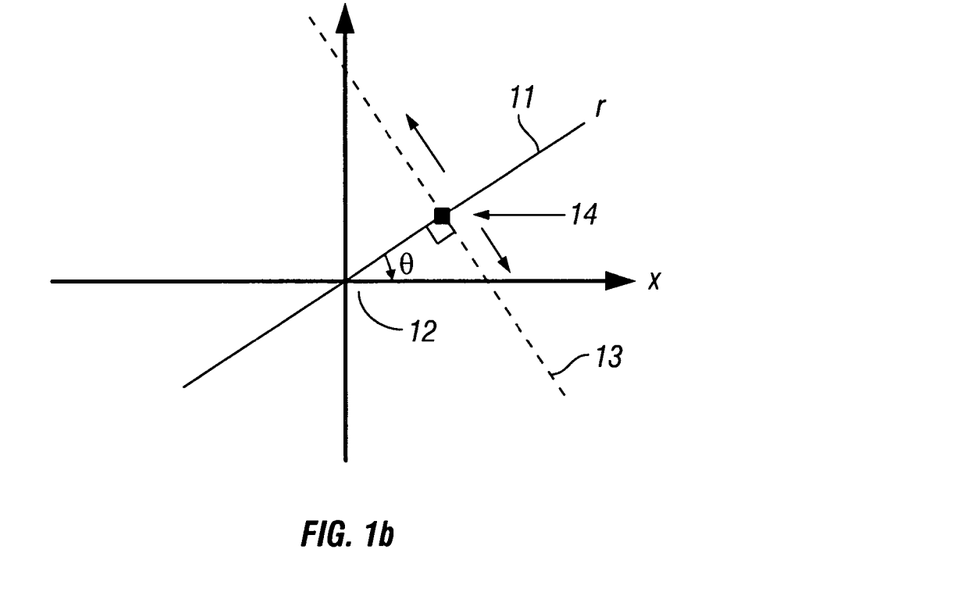

In contrast to the forward transform, the inverse Radon transform maps values in the cylindrical space back to the values in the original rectangular coordinates. The geometrical meaning of the inverse transform is the reverse of the forward transform and is shown in FIG. 1b. The value at the intersection point 14 $(r, \theta, l\Delta t)$ is distributed uniformly to all points along the perpendicular line 13. The inverse Radon transform can be considered as a back-projection of true-dip energy to its apparent-dip direction.

In another embodiment, the technique employed in the method of the invention to transform seismic data from a rectangular coordinate domain utilizes a 1-D Fourier transform in addition to a forward Radon transform. This technique transforms the data to a wavenumber domain and is appropriate for depth migration. Let $k_x$ and $k_y$ be the horizontal wavenumbers corresponding to the x and y directions and let $k_r$ be the wavenumber corresponding to the radial direction r. The relationships between the wavenumbers $k_x$, $k_y$, and $k_r$ are given by:

$$k_x = k_r \cos\theta,$$
$$k_y = k_r \sin\theta, \text{ and} \tag{4}$$
$$k_r = \sqrt{k_x^2 + k_y^2}$$

for a given azimuth angle $\theta$.

Let $q(r, \theta, z, t)$ be the forward Radon transform of $p(x, y, z, t)$, as in Equation (2) above. Let $Q(k_r, \theta, z, t)$ be the 1-D Fourier (spatial) transform of $q(r, \theta, z, t)$ with respect to the radial direction r and let $P(k_x, k_y, z, t)$ be the 2-D Fourier (spatial) transform of $p(x, y, z, t)$ with respect to the x and y directions. Then, $Q(k_r, \theta, z, t)$ is equal to a corresponding slice of $P(k_x, k_y, z, t)$. This result follows from applying the projection slice theorem to the Radon transform defined in Equation (2). Let $F_1$ and $F_2$ designate the 1-D and 2-D Fourier transform operators, respectively, described above, and this result can be expressed as follows:

$$Q(k_r, \theta, z, t) \equiv F_1[q(r, \theta, z, t)] \tag{5}$$
$$= F_1\{R[p(x, y, z, t)]\}$$
$$= P(k_x, k_y, z, t)$$
$$\equiv F_2[p(x, y, z, t)],$$

for given constant $\theta$ and t.

To demonstrate Equation (5), a 1-D Fourier transform with respect to r, $F_1$, is applied to $q(r, \theta, z, t)$, the forward Radon transform of $p(x, y, z, t)$:

$$F_1[q(r, \theta, z, t)] = \int_{-\infty}^{\infty} q(r, \theta, z, t)\exp(-ik_r r)\,dr \tag{6}$$

Substituting Equation (2) into Equation (6) and exchanging the order of integration between dx dy and dr yields $$F_1[q(r, \theta, z, t)] = \int_{-\infty}^{\infty}\left\{\int_{-\infty}^{\infty}\int_{-\infty}^{\infty} p(x, y, z, t)\delta(x\cos\theta + y\sin\theta - r)\right. \tag{7}$$
$$dx\,dy\}\exp(-ik_r r)\,dr$$
$$= \int_{-\infty}^{\infty}\int_{-\infty}^{\infty} p(x, y, z, t)\left\{\int_{-\infty}^{\infty} \delta(x\cos\theta + y\sin\theta - r)\right.$$
$$\exp(-ik_r r)\,dr\}dx\,dy$$

Applying the definition of the Dirac delta function and substituting Equation (4) in Equation (7) yields:

$$F_1[q(r, \theta, z, t)] = \int_{-\infty}^{\infty}\int_{-\infty}^{\infty} p(x, y, z, t)\exp[-ik_r(x\cos\theta + y\sin\theta)] \tag{8}$$
$$dx\,dy$$
$$= \int_{-\infty}^{\infty}\int_{-\infty}^{\infty} p(x, y, z, t)\exp[-i(k_x x + k_y y)]dx\,dy$$
$$\equiv P(k_x, k_y, z, t).$$

Because the second line of Equation (8) is exactly the 2-D Fourier transform of $p(x, y, z, t)$ in the x and y directions, then $P(k_x, k_y, z, t)$ is the same as expressed in Equation (5), utilizing the relationship between $k_x$, $k_y$, and $k_r$ defined in Equation (4). This means that for a given t and θ, Q($k_r$, θ, z, t), a 1-D Fourier transform with respect to r of q(r, θ, z, t), the Radon transform of p(x, y, z, t), is equal to a slice of P($k_x$, $k_y$, z, t), the 2-D Fourier transform of p(x, y, z, t) with respect to x and y, in the radial line of the wavenumber domain ($k_x$, $k_y$), with the same azimuth parameter θ.

The 3-D wave-equation commonly used in modern seismic imaging:

$$\Delta p(x, y, z, t) = \frac{1}{v^2(x, y, z)} \frac{\partial^2}{\partial t^2} p(x, y, z, t) \quad (9)$$

can be reduced to the following independent 2-D wave equations in a transformed data space with a cylindrical coordinate system:

$$\Delta q_\theta(r, z, t) = \frac{1}{v^2(r, z)} \frac{\partial^2}{\partial t^2} q_\theta(r, z, t) \text{ for each } \theta \in [0, \pi], \quad (10)$$

where individual $q_\theta(r, z, t) = q(r, \theta, z, t)$ on radial lines given by azimuth angle θ in [0,π] as a parameter.

Therefore, 3-D migration, based on the 3-D wave equation as given in Equation (9), can be replaced by 2-D migration based on the 2-D wave-equation as given in Equation (10), implemented along a serious of radial lines defined by the parameter θ.

Figure 3:
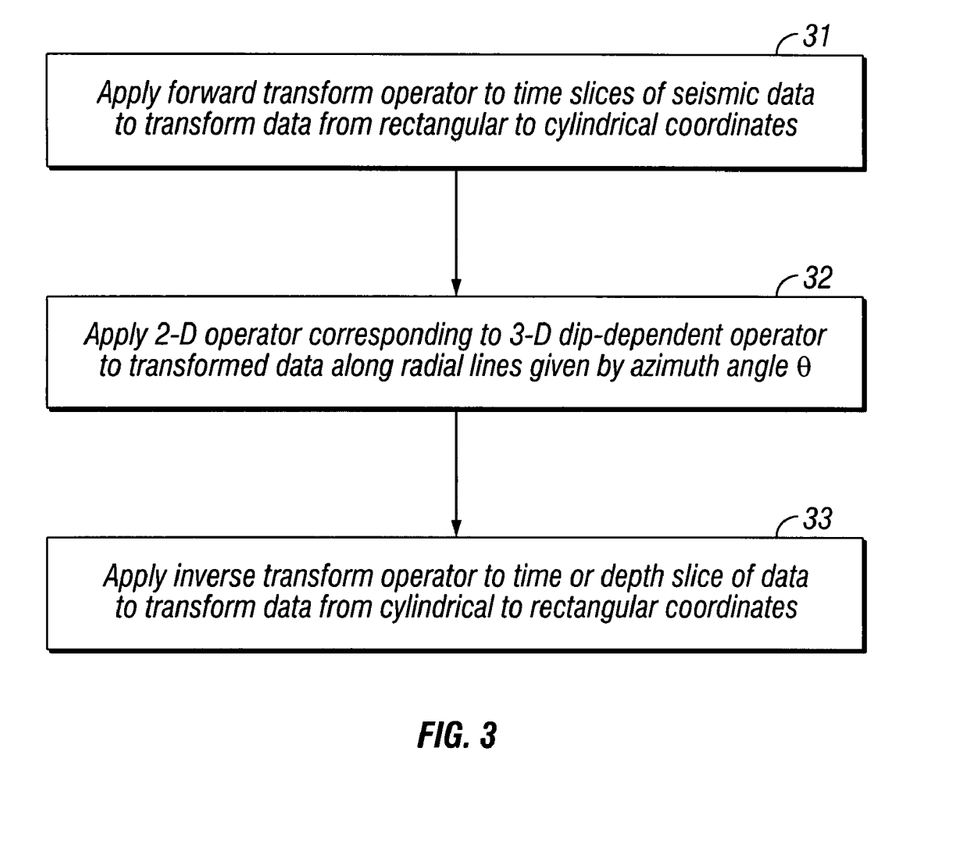
FIG. 3 is a flowchart illustrating the steps of an embodiment of the method of the invention for performing 3-D seismic migration for generally inhomogeneous media.

FIG. 3 is a flowchart illustrating the steps of an embodiment of the method of the invention for performing 3-D dip-dependent filtering for generally inhomogeneous media. Although the method of the invention is illustrated for seismic migration, it can be equally applied to 3-D dip-dependent filtering to reduce them to 2-D dip-dependent filtering, based on the same principle. For simplicity of illustration, the method of the invention will be described for the case of zero offset data. Thus, let the input data be zero offset 3-D seismic data p(x, y, z=0, t), defined in a rectangular coordinate domain (x, y, z, t). The method of the invention comprises the following three operations.

First, in step 31, a forward transform operator is applied to time slices (t=constant) of the seismic data to transform the data from p(x, y, z=0, t) in rectangular coordinates to q(r, θ, z=0, t) in cylindrical coordinates. In one embodiment, the forward transform operator is a forward Radon transform, R, applied to the time slices of the seismic data to transform the data from rectangular coordinates to cylindrical coordinates, as follows:

$$R[p(x,y,z=0,t)]=q(r,\theta,z=0,t) \text{ for } t\text{=constant.} \quad (11)$$

The Radon transform operator R is as defined above in Equation (2).

In another embodiment, the forward transform operator is a 1-D Fourier transform with respect to the radial direction r, designated by an operator $F_1$, applied to the Radon transform q(r, θ, z=0, t) of p(x, y, z=0, t) from Equation (11).

$$F_1[q(r, \theta, z, t)] = Q(k_r, \theta, z, t) \quad (12)$$
$$= P(k_x, k_y, z, t),$$

for given constants θ and t. As discussed above with respect to the discussion of Equations (5) to (8), Q($k_r$, θ, z, t) is equal to the desired corresponding slice of P($k_x$, $k_y$, z, t). The slices have been acquired by a value picking process (interpolation) in the wavenumber domain ($k_x$, $k_y$) along radial lines corresponding to the parameter θ.

The transformed data P($k_x$, $k_y$, z, t) is now in a wavenumber domain. If the 2-D depth migration is to be done in the wavenumber-time ($k_r$, t) domain or in the wavenumber-frequency ($k_r$, ω) domain, then the process proceeds to depth migration in step 32. If, however, the 2-D depth migration is to be done in a space-time (r, t) domain, then an inverse Fourier transform will be required first to return to the space-time domain.

Second, in step 32, a 2-D operator, or series of 2-D operators, is applied to the result from step 31 along radial lines (θ=constant) as given by the azimuth angle parameter in the interval [0,π]. The 2-D operator is defined for each azimuth angle θ and corresponds to any dip-dependent 3-D operator.

To avoid detrimental effects from insufficient spatial sampling, the number of radial lines (parameter θ) is chosen to be equal or greater than the sum of the number of in-lines plus the number of cross-lines in the survey. Moreover, the trace interval on the radial lines is made equal to or smaller than the smallest trace interval in the in-line or the cross-line directions in the survey.

In one particular embodiment, a 2-D seismic migration, designated by an operator $M_2$, is applied to the result q(r, θ, z=0, t) of Equation (11) along all radial lines given by the azimuth parameter θ:

$$M_2[q(r,\theta,z=0,t)]=q'(r,\theta,T \text{ or } z,t=0) \text{ for each } \theta\in[0,\pi], \quad (13)$$

where T is the travel time for time migration and z is the depth for depth migration. Any accurate 2-D migration algorithm can be used for this 3-D migration method. The seismic migration could be either time or depth migration. Thus, with $M_2=M_2^t$ designating a 2-D time migration operator, Equation (13) becomes:

$$M_2^t[q(r,\theta,z=0,t)]=q'(r,\theta,T,t=0), \quad (14)$$

while, with $M_2=M_2^d$ designating a 2-D depth migration operator, Equation (13) becomes:

$$M_2^d[q(r,\theta,z=0,t)]=q'(r,\theta,z,t=0). \quad (15)$$

In particular, any existing accurate 2-D migration algorithm can be applied in step 32 of this method to achieve the exact 3-D migration result without need of any sophisticated and complicated 3-D migration algorithm and calculation. More than this, the procedure is a series of 2-D operations and hence requires minimal amounts of data to be kept in computer memory.

Equations (4) and (5) provide a close link between the Radon transform defined in Equation (2) and the Single Square Root (SSR) equation, the well-known downward-continuation 3-D migration operator, via the key term:

$$-\sqrt{\frac{\omega^2}{v^2} - (k_x^2 + k_y^2)}. \quad (16)$$

The 2-D operator ($k_x^2+k_y^2$) is commonly involved in today's typical and most useful 3-D depth migration operators. If we apply a Radon transform as in Equation (2) on time slices, followed by 1-D Fourier transform with respect to radial direction r as in Equation (5), the 2-D operator ($k_x^2+k_y^2$)

involved in all the above 3-D migration operators will be reduced to 1-D operator $k_r^2$ along radial lines in the same way. Therefore, most modern 3-D SSR migration operators, time and depth, post-stack and pre-stack, can be reduced to their 2-D migration operator counterparts by using this method. Correspondingly, all 3-D migration implementations can be reduced to 2D migration implementations on the same basis.

Third, in step 33, an inverse transform operator is applied to a time or depth slice taken in the result from step 32. In one embodiment, the inverse transform operator is an inverse Radon transform, $R^{-1}$, applied to a time slice q'(r, θ, T=constant, t=0) from Equation (14):

$$R^{-1}[q'(r,\theta,T,t=0)]=p(x,y,T,t=0) \text{ for } T=\text{constant}, \quad (17)$$

or applied to a depth slice q'(r, θ, z=constant, t=0) from Equation (15):

$$R^{-1}[q'(r,\theta,z,t=0)]=p(x,y,z,t=0) \text{ for } z=\text{constant}. \quad (18)$$

The inverse Radon transform operator $R^{-1}$ is as defined above in Equation (3). A filter is applied to q' to include the enhanced frequency components that are required for exact inversion.

Each of above three steps has a physical interpretation. In step 31, the forward transform, such as the forward Radon transform R, projects 3-D events from all apparent-dip directions to their true-dip direction to remove the 3-D azimuth effect. In step 32, the 2-D operator, such as the 2-D migration operator $M_2$, migrates the decomposed true-dip events along all radial lines. In step 33, the inverse transform, such as the inverse Radon transform $R^{-1}$, back-projects the 2-D migrated events along apparent-dip directions to finish the 3-D migration.

The forward Radon transform R and the inverse Radon transform $R^{-1}$ applied in the steps 31 and 33, respectively, are typical Radon transformations, but here are applied on seismic time or depth slices instead of on sections.

The first and the third steps provide a generalized transform of reducing 3-D data processing to 2-D data processing, and the second step can be application of any 2-D filtering or processing operators instead of 2-D migration. Therefore, the method can accomplish any dip-dependent 3-D filtering operators with simpler 2-D filtering operators. In practice, any 2-D filtering operators can be applied either before or after (or both) 2D migration in the second-step to achieve a unique combination of 3-D migration and 3-D filtering in the same method. The above method of the invention is accurate for vertically inhomogeneous media (vertical velocity variation) and also well adapted for laterally inhomogeneous media (lateral velocity variation).

Designating the 2-D and 3-D migration operators as $M_2$ and $M_3$, respectively, the method of the invention may be summarized for the case of seismic migration as follows:

$$M_3[p(x, y, z = 0, t)] = R^{-1}\{M_2\{R[p(x, y, z = 0, t)]\}\} \quad (19)$$
$$= R^{-1}\{M_2[q_\theta(r, z = 0, t)]\} \text{ for } \theta \in [0, \pi],$$

using the notation $q_\theta$ as described above in the discussion of Equation (10).

The method of the invention can be applied to both post- and pre-stack 3-D migration. However, when dealing with pre-stack 3-D migration, the Radon transform on shots has to be considered and included in Equation (19). Let the positions of shots be given by:

$$x_s = r_s \cos\theta_s \text{ and } y_s = r_s \sin\theta_s. \quad (20)$$

Then, the Radon transform of the Dirac delta function term is as follows:

$$R[\delta(x-x_s, y-y_s)]=\delta[r-r_s \cos(\theta-\theta_s)]. \quad (21)$$

Each shot can be decomposed as its azimuth components along different radial lines based on Equation (21), and these decomposed shots should then be included in 2-D pre-stack migration for all radial lines.

The method of the invention provides a useful procedure for reducing 3-D pre-stack migration to 2-D pre-stack migration. There are several differences between 3-D pre-stack and 3-D post-stack migration in utilizing the method of the invention. In step 31 of FIG. 3, a forward Radon transform is applied on pre-stack instead of post-stack data. In step 32 of FIG. 3, the applied 2-D operator is 2-D pre-stack migration instead of 2-D post-stack migration.

EXAMPLE

Figure 2A:
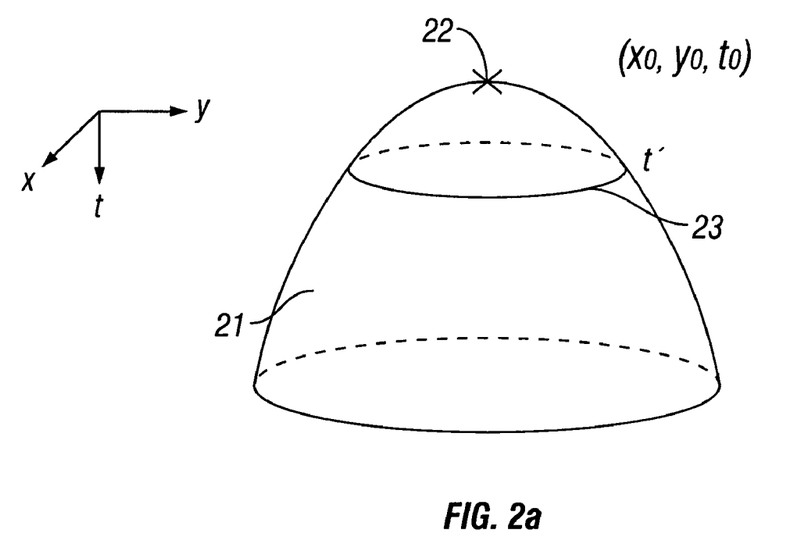
FIGS. 2a-2d are diagrams illustrating seismic migration according to an embodiment of the method of the invention for performing 3-D seismic migration for generally inhomogeneous media.

This example illustrates the method of the invention as applied to 3D time migration to reduce it to a series of 2-D true-dip migration processes. FIGS. 2a-2d are diagrams illustrating seismic migration according to an embodiment of the method of the invention for performing 3-D seismic migration for generally inhomogeneous media. FIG. 2a shows a 3-D model of the diffraction hyperboloid 21 for a diffraction point 22 at $(x_0, y_0, t_0)$ in a vertically varying medium. The solid circle 23 designates a time slice at time t'.

Figure 2B:
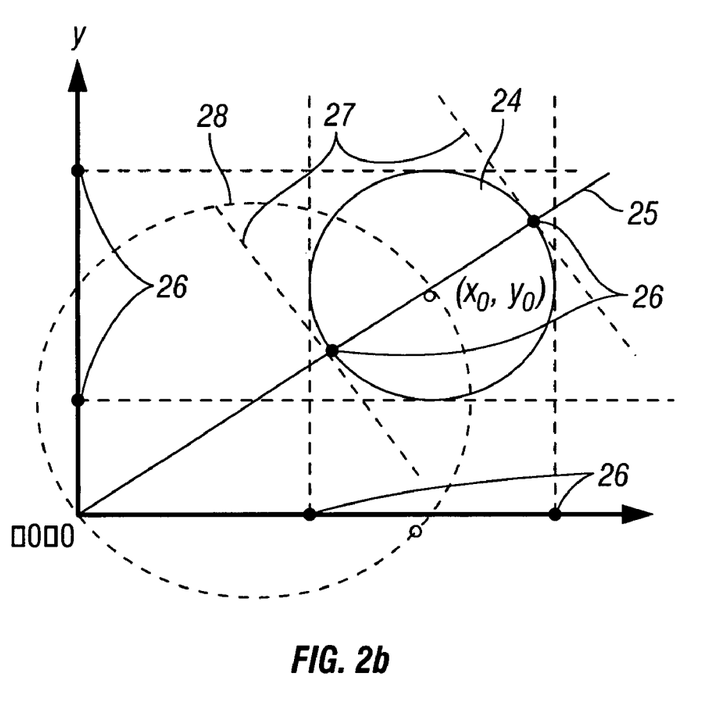

The 3-D stacked data comprise a hyperbola 21 of revolution, as shown in FIG. 2a. In the first pass through the data, forward Radon transforms are applied on all time slices of the stacked data. The result from a particular time slice 23 at t'>$t_0$ is shown in FIG. 2b. The diffraction energy appears as a circle 24 on the time slice 23. For a given radial direction 25, given by azimuth θ, the forward Radon transform results in significant energy at two locations 26 along the radial line 25. These locations 26 are where the perpendicular 27 to line 25 is tangent to the diffraction time slice 23 in FIG. 2b. For any radial direction 25, the distance between each pair of projection points 26 is the same, which is equal to the diameter of the circle 24. Thus, each radial section will see identical hyperbolic diffraction curves. Moreover, the loci of midpoints for each pair of projection points 26 for all radial lines 25 is a circle, shown as the dashed circle 28 in FIG. 2b.

Figure 2C:
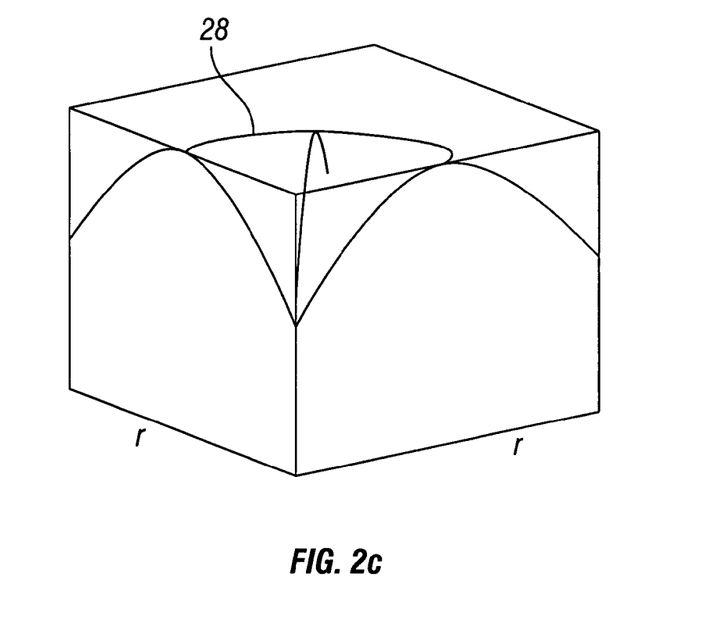

Each radial section now contains an identical diffraction hyperbola 21 characterized by the vertical velocity variation. Each diffraction hyperbola 21 has identical shape and apex time. Unlike with conventional 2-D two-pass implementation of 3-D migration, these hyperbolae 21 are identical even when velocity varies vertically. A 3-D perspective view of three radial sections (for θ=0°, 45°, and 90°) is shown in FIG. 2c. The loci of the hyperbola apexes at the time slice is the same circle 28 described in FIG. 2b. Since a diffraction point contains all azimuth and dips, each radial section will contain some true-dip information for this specific model as verified above. Having decomposed the data into true dip components, next 2-D migration and 2-D processing are done for each radial section. Any accurate 2-D migration algorithm with the true velocity will accurately migrate the 2-D diffraction curves to their apexes without any detrimental effect caused by reflector azimuth. After finishing 2-D migration on all radial lines 25, the energy has been migrated to time $t_0$ and lies along the circle 28 at the time $t_0$ slice.

Figure 2D:
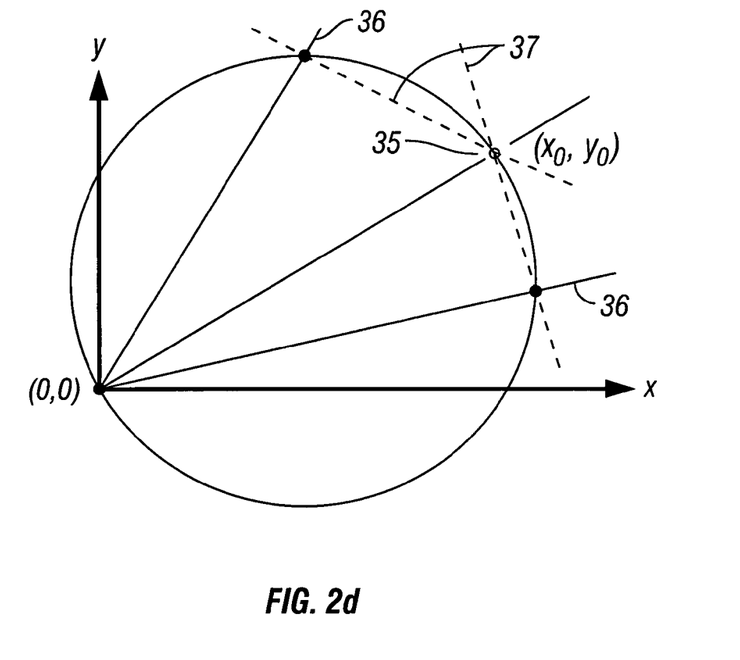

The third and final step is to apply an inverse Radon transform to each migrated time slice. Because the energy is concentrated only on time slice t=$t_0$ after the 2-D migration, only this time slice is shown in FIG. 2d. Based on the geometric meaning of an inverse Radon transform as described above in FIG. 1b, the energy on every point along the circle 28 of FIG. 2b will be back-projected to one common point 35 at coordinates ($x_0$, $y_0$) at the apex time. This is illustrated in FIG. 2d with the back-projection of two radial lines 36. Straight dashed lines 37 are back-projection trajectories. Only the location 35 at the apex of diffraction receives a contribution from every radial line 36. Thus the above three-pass implementation exactly accomplishes 3-D time migration for vertically inhomogeneous media by 2-D time migration algorithms.

CONCLUSIONS

The invention provides a solution to the classic problem of 3-D wave-equation separation for inhomogeneous media in a transformed data space and a non-Cartesian coordinate system. By using the transformation method of the invention, the 3-D wave-equation can be reduced to independent 2-D wave-equations along radial lines (parameterized by different azimuths) for both vertical and lateral velocity variations. This solution to the separation problem provides a computationally efficient means for reducing 3-D migration to 2-D migration for inhomogeneous media.

The method of the invention utilizes three passes through the seismic data volume. In one embodiment, the first-pass and the third-pass operations are forward and inverse Radon transforms, respectively. The forward transform is implemented on time slices of 3-D data while the inverse transform is implemented on either time or depth slices depending on whether time or depth migration, respectively, was employed in the second-pass operation. The forward transform decomposes data into their true-dip direction, while the inverse transform maps the true-dip data back to its apparent-dip directions. 3-D pre- and post-stack migration and dip-dependent processing operators can be efficiently reduced to 2-D migration and processing operators for inhomogeneous media by the method of the invention.

The second pass in the method of the invention can be any 2-D processing operation, such as 2-D migration, which operates on a series of radial, true-dip directions. 3-D migration can be performed as a series of 2-D migrations without any degradation caused by reflector azimuth because azimuth is not an issue for the true-dip sections. Thus, 3-D migration can be performed with the efficiency of 2-D migration operations, but with full dip accuracy. The method of the invention is suitable for both time and depth migration and any accurate 2-D migration algorithms can be used in this method to achieve its equivalent 3-D migration result.

The forward Radon transform on time slices can be accomplished in both space and wavenumber domains, utilizing appropriate Fourier transforms. The wavenumber form of the forward Radon transform on the time slices (and its close link with the SSR migration operator) explicitly indicates how the 2-D SSR extrapolation operator in rectangular coordinates can be reduced to the 1-D operator along radial lines by employing the method of the invention.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for performing 3-D pre-stack depth migration for generally inhomogeneous media, comprising:
   using a programmable computer to perform the following:
   transforming time slices of seismic data from rectangular space-time domain to cylindrical space-time domain;
   performing 2-D pre-stack depth migration for generally inhomogeneous media on the transformed data for each radial direction; and
   inverse transforming depth slices of the depth migrated data back to the rectangular space-time domain.

2. The method of claim 1, wherein the transforming time slices comprises:
   applying a forward Radon transform to the time slices.

3. The method of claim 2, wherein the transforming time slices further comprises:
   applying a Fourier transform to the Radon-transformed slices.

4. The method of claim 3, wherein the transforming time slices further comprises:
   applying an inverse Fourier transform to the Fourier-transformed slices.

5. The method of claim 1, wherein the inverse transforming slices comprises:
   applying an inverse Radon transform to the depth-migrated depth slices.

6. The method of claim 1, wherein the performing 2-D migration further comprises:
   applying a 2-D data processing operator to the transformed data for each radial direction before performing the 2-D migration.

7. The method of claim 1, wherein the performing 2-D migration further comprises:
   applying a 2-D data processing operator to the migrated data for each radial direction after performing the 2-D migration.

8. The method of claim 1, wherein the performing 2-D migration further comprises:
   applying a 2-D data processing operator to the transformed data for each radial direction before performing the 2-D migration; and
   applying a 2-D data processing operator to the migrated data for each radial direction after performing the 2-D migration.

9. A computer readable medium with a computer program stored thereon, the program having logic operable to cause a programmable computer to perform steps comprising:
   transforming time slices of seismic data from rectangular space-time domain to cylindrical space-time domain;
   performing 2-D pre-stack depth migration for generally inhomogeneous media on the transformed data for each radial direction; and
   inverse transforming depth slices of the depth migrated data back to the rectangular space-time domain.

10. The medium of claim 9, wherein the transforming time slices comprises:
    applying a forward Radon transform to the time slices.

11. The medium of claim 10, wherein the transforming time slices further comprises:
    applying a Fourier transform to the Radon-transformed slices.

12. The medium of claim 11, wherein the transforming time slices further comprises:
    applying an inverse Fourier transform to the Fourier-transformed slices.

13. The medium of claim 9, wherein the inverse transforming slices comprises:

applying an inverse Radon transform to the depth-migrated depth slices.

14. The medium of claim 9, wherein the performing 2-D migration further comprises:

applying a 2-D data processing operator to the transformed data for each radial direction before performing the 2-D migration.

15. The medium of claim 9, wherein the performing 2-D migration further comprises:

applying a 2-D data processing operator to the migrated data for each radial direction after performing the 2-D migration.

16. The medium of claim 9, wherein the performing 2-D migration further comprises:

applying a 2-D data processing operator to the transformed data for each radial direction before performing the 2-D migration; and applying a 2-D data processing operator to the migrated data for each radial direction after performing the 2-D migration.

* * * * *